United States Patent
Shirata et al.

(10) Patent No.: US 9,904,373 B2
(45) Date of Patent: Feb. 27, 2018

(54) KEYBOARD WITH TABLET HOLDER

(71) Applicant: Sony Corporation, Tokyo (JP)

(72) Inventors: Atsushi Shirata, Tokyo (JP); Hiroshi Tamaki, Tokyo (JP); Tamio Nishino, Saitama (JP)

(73) Assignees: Sony Corporation, Tokyo (JP); Sony Mobile Communications Inc., Tokyo (JP)

( * ) Notice: Subject to any disclaimer, the term of this patent is extended or adjusted under 35 U.S.C. 154(b) by 147 days.

(21) Appl. No.: 15/055,071

(22) Filed: Feb. 26, 2016

(65) Prior Publication Data

US 2016/0252971 A1 Sep. 1, 2016

Related U.S. Application Data

(60) Provisional application No. 62/121,971, filed on Feb. 27, 2015.

(51) Int. Cl.
| | |
|---|---|
| *H05K 7/00* | (2006.01) |
| *G06F 1/16* | (2006.01) |
| *G06F 3/02* | (2006.01) |
| *G06F 3/023* | (2006.01) |

(52) U.S. Cl.
CPC .......... *G06F 3/0219* (2013.01); *G06F 1/1632* (2013.01); *G06F 1/1669* (2013.01); *G06F 3/0227* (2013.01); *G06F 3/0231* (2013.01)

(58) Field of Classification Search
CPC ............................................. G06F 1/16
USPC ................................................... 361/679.21
See application file for complete search history.

(56) References Cited

U.S. PATENT DOCUMENTS

| | | | |
|---|---|---|---|
| 6,530,784 B1 * | 3/2003 | Yim ...................... | G06F 1/1616 361/679.29 |
| 2015/0092333 A1 * | 4/2015 | Kim ...................... | G06F 1/1632 361/679.17 |

FOREIGN PATENT DOCUMENTS

JP  2015-35027  2/2015

* cited by examiner

*Primary Examiner* — Jerry Wu
(74) *Attorney, Agent, or Firm* — Oblon, McClelland, Maier & Neustadt, L.L.P.

(57) ABSTRACT

An apparatus for holding a touch screen device, the apparatus includes an elongated recess sized to receive a side edge of the touch screen device, a least one U-shaped resilient member disposed in the elongated recess, a first elastomer pad positioned on the at least one U-shaped resilient member, the first elastomer pad including a first touch screen device engaging surface, and in which the at least one U-shaped member includes at least one slot defining a first resilient portion that abuts the first elastomer pad.

12 Claims, 8 Drawing Sheets

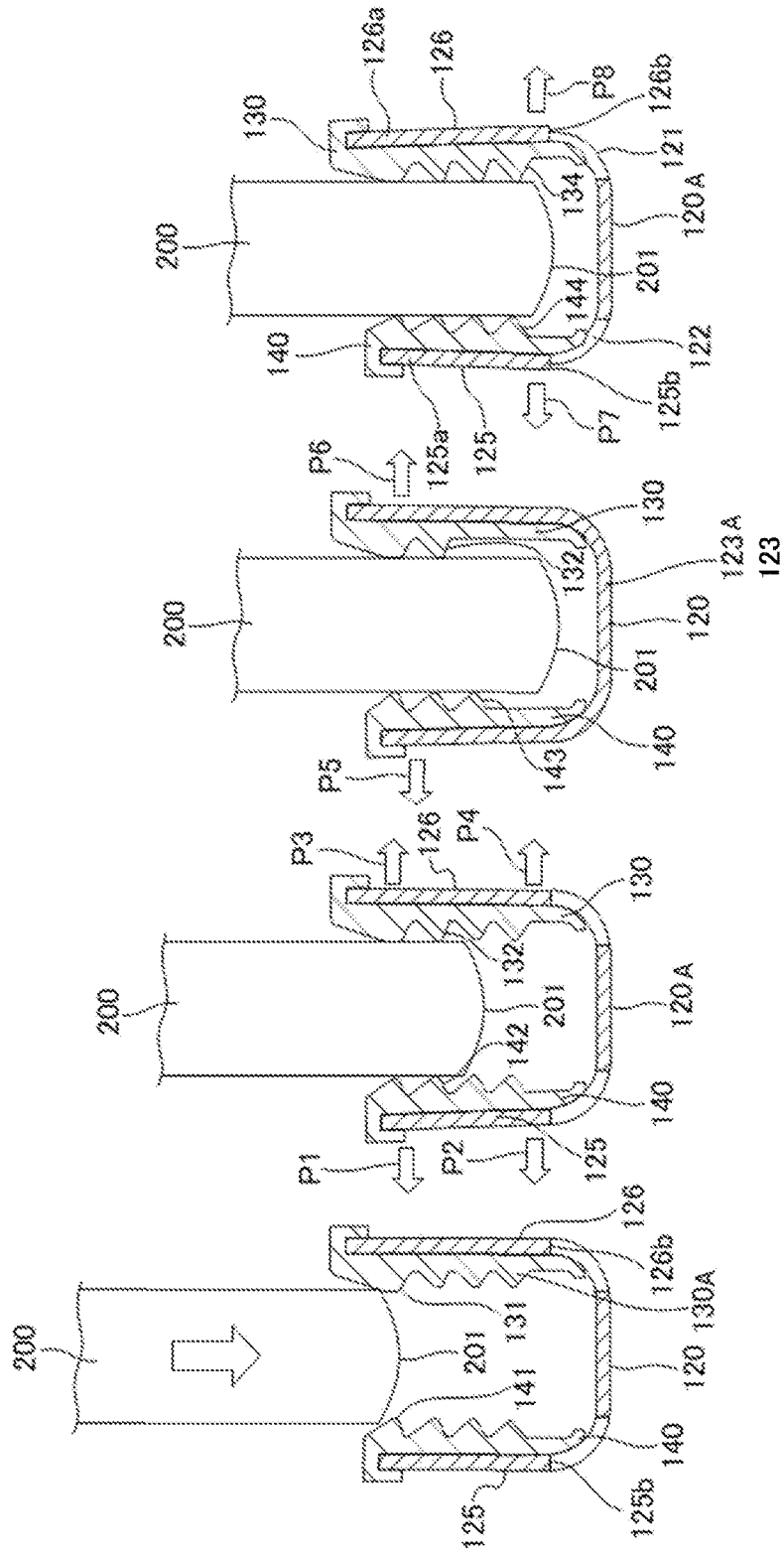

RELATED ART

KEYBOARD WITH TABLET HOLDER

INCORPORATION BY REFERENCE

This present disclosure claims the benefit of U.S. Provisional Application No. 62/121,971, filed on Feb. 27, 2015, which is incorporated herein by reference in its entirety.

FIELD OF THE DISCLOSURE

This invention relates accessory keyboards for tablet computers.

BACKGROUND

When using a tablet computer ("tablet") with an external keyboard it is desirable to have the tablet standing up from the surface on which the external keyboard and tablet are located, thereby emulating the ergonomics of a laptop computer.

Certain prior art external keyboards for tablets have provisions for supporting tablets with which they are used in an upright position. For example a hole may be provided in a tablet and a mating protrusion provided in the keyboard. Alternatively, the keyboard may be provided with a magnet which sticks to a steel plate which forms a part of the tablet. In the case of the aforementioned attachment mechanisms the tablet and the keyboard must be designed for each other. Certain prior art attachable keyboards assumed strict tolerances on the thickness of the mating tablets such that the thickness of certain screen protectors (e.g., Mass ones) caused mechanical interference and prevent coupling of the tablet and the tablet receiving portion of the keyboard.

SUMMARY

One aspect of the disclosed subject matter provides an apparatus for holding a flat touch screen device, the apparatus that includes: an elongated recess sized to receive a side edge of the flat touch screen device; at least one U-shaped resilient member disposed in the elongated recess, a first elastomer pad positioned on the at least one U-shaped resilient member, the first elastomer pad including a first flat touch screen device engaging surface, and the at least one U-shaped member includes at least one slot defining a first resilient portion that abuts the first elastomer pad.

In the apparatus for holding the flat touch screen device described above the U-shaped resilient member can include a first upright portion and the at least one slot can be a first U-shaped slot that defines the first resilient portion and the first resilient portion can be part of the first upright portion.

In the apparatus for holding the flat touch screen device described above the U-shaped resilient member can include an open end and the resilient portion can include a first end connected to a remaining portion of the U-shaped resilient member and a second end that is a free end, wherein the first end of the resilient portion is closer than the second end of the resilient portion to the open end of the U-shaped resilient member.

In the apparatus for holding the flat touch screen device described above the first flat touch screen device engaging surface can include at least one protruding line.

In the apparatus for holding the flat screen device described above the at least one protruding line can have a cross-sectional shape that includes a lower angled surface, an upper angled surface and an intermediate surface joining the lower angled surface and the upper angled surface.

In the apparatus for holding the flat screen device described above the lower angled surface can be angled at more than 45 degrees with respect to an insertion direction which is parallel to a vertical axis of the U-shaped resilient member and the upper angled surface can be angled at less than 45 degrees with respect to the insertion direction.

In the apparatus for holding the flat screen device described above the at least one protruding line can be one of a plurality of protruding lines.

In the apparatus for holding the flat touch screen device described above the at least one protruding line can at least partially overlie the first resilient portion.

In the apparatus for holding the flat touch screen device described above the at least one protruding line can fully overlie the first resilient portion.

In the apparatus for holding the flat screen device described above the at least one protruding line can have a cross-sectional shape that includes a lower angled surface, an upper angled surface and an intermediate surface joining the lower angled surface and the upper angled surface.

In the apparatus for holding the flat screen device described above the lower angled surface can be angled more than 45 degrees with respect to an insertion direction which is parallel to a vertical axis of the U-shaped resilient member and the upper angled surface can be angled less than 45 degrees with respect to the insertion direction.

In the apparatus for holding the flat touch screen device described above the U-shaped resilient member can include a first upright portion and the at least one slot can include a first U-shaped slot defining the first resilient portion and the first resilient portion can be part of the first upright portion.

In the apparatus for holding the flat touch screen device described above the U-shaped resilient member can also include a second upright portion located opposite the first upright portion and a second slot defining a second resilient portion of the U-shaped resilient member, where the second resilient portion is part of the second upright portion.

In the apparatus for holding the flat touch screen device described above the second slot can include a second U-shaped slot.

In the apparatus for holding the flat touch screen device described above the U-shaped resilient member can include a first upright portion and a second upright portion and the first resilient portion can be on the first upright portion and a second resilient portion can be on the second upright portion and a second elastomeric pad can be provided abutting the second resilient portion.

In the apparatus for holding the flat touch screen device described above the second elastomeric pad can include a second flat touch screen device engaging surface that includes a second protruding line.

In the apparatus for holding the flat touch screen device described above the first protruding line can be vertically aligned with the second protruding line.

In the apparatus for holding the flat touch screen device described above the first flat touch screen device engaging surface can include a first plurality of protruding lines one of which is the first protruding line.

In the apparatus for holding the flat touch screen device described above the second flat touch screen device engaging surface can include a second plurality of protruding lines one of which is the second protruding line.

In the apparatus for holding the flat touch screen device described above in the case that the second protruding line is closest in vertical height among the second plurality of protruding lines to the first protruding line, a first horizontal distance between the first protruding line and the second protruding line can be less than a second horizontal distance between a third protruding line that is included in the first plurality of lines and a fourth protruding line that is included in the second plurality of lines where the third protruding line is above the first protruding line and the fourth protruding line is above the second protruding line.

Another aspect of the disclosure provides an apparatus for holding a flat touch screen device, the apparatus includes: an elongated recess sized to receive a side edge of the flat touch screen device, at least one U-shaped resilient member disposed in the elongated recess, the U-shaped resilient member including: a first upright portion, a second upright portion located opposite the first upright portion, and a base portion coupled to the first upright portion and the second upright portion, a first elastomer pad positioned on the first upright portion, the first elastomer pad including a first flat touch screen device engaging surface; a second elastomer pad positioned on the second upright portion, the second elastomer pad including a second flat touch screen device engaging surface; wherein a local minimum distance between the first elastomer pad and the second elastomer pad is a monotonic increasing function of distance from the base portion.

According to another aspect of the disclosure a keyboard includes the above described apparatus for holding the flat touch screen device.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 11A is a third cross-section view through the U-shaped channel member and serrated rubber pads shown in FIGS. 1, 6 with the tablet shown in FIGS. 2-3 partially inserted;

FIG. 11B is a fourth cross-section view through the U-shaped channel member and serrated rubber pads shown in FIGS. 1, 6 with the tablet shown in FIGS. 2-3 partially inserted;

FIG. 11C is a fifth cross-section view through the U-shaped channel member and serrated rubber pads shown in FIGS. 1, 6 with the tablet shown in FIGS. 2-3 partially inserted;

FIG. 11D is a sixth cross-section view through the U-shaped channel member and serrated rubber pads shown in FIGS. 1, 6 with the tablet shown in FIGS. 2-3 partially inserted;

DETAILED DESCRIPTION OF THE PREFERRED EMBODIMENTS

Figure 1:
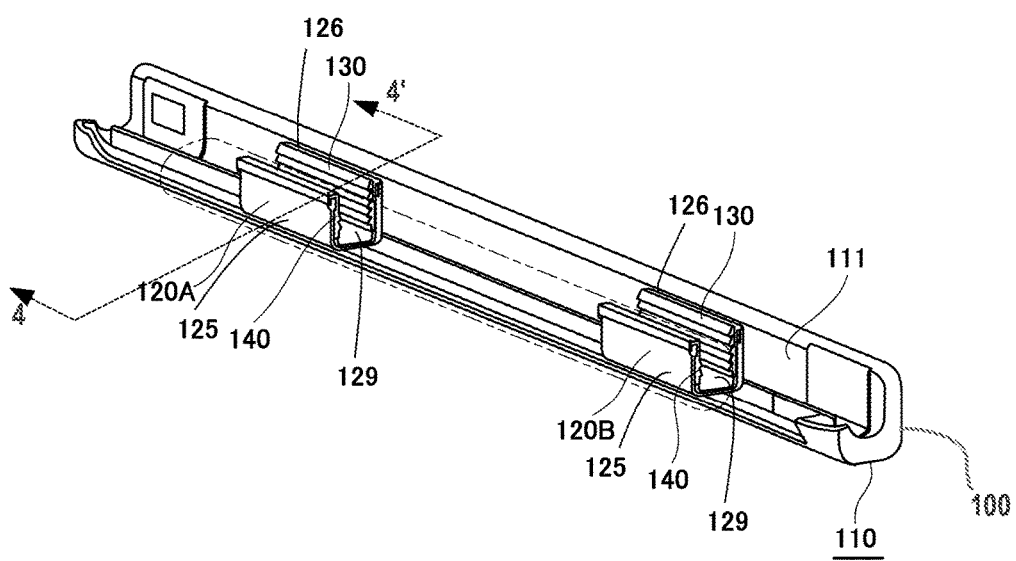
FIG. 1 is a partially cutaway view of a tablet receiving portion of an external keyboard for a tablet according to an embodiment.

Referring now to the drawings, wherein like reference numerals designate identical or corresponding parts throughout the several views.

Figure 2:
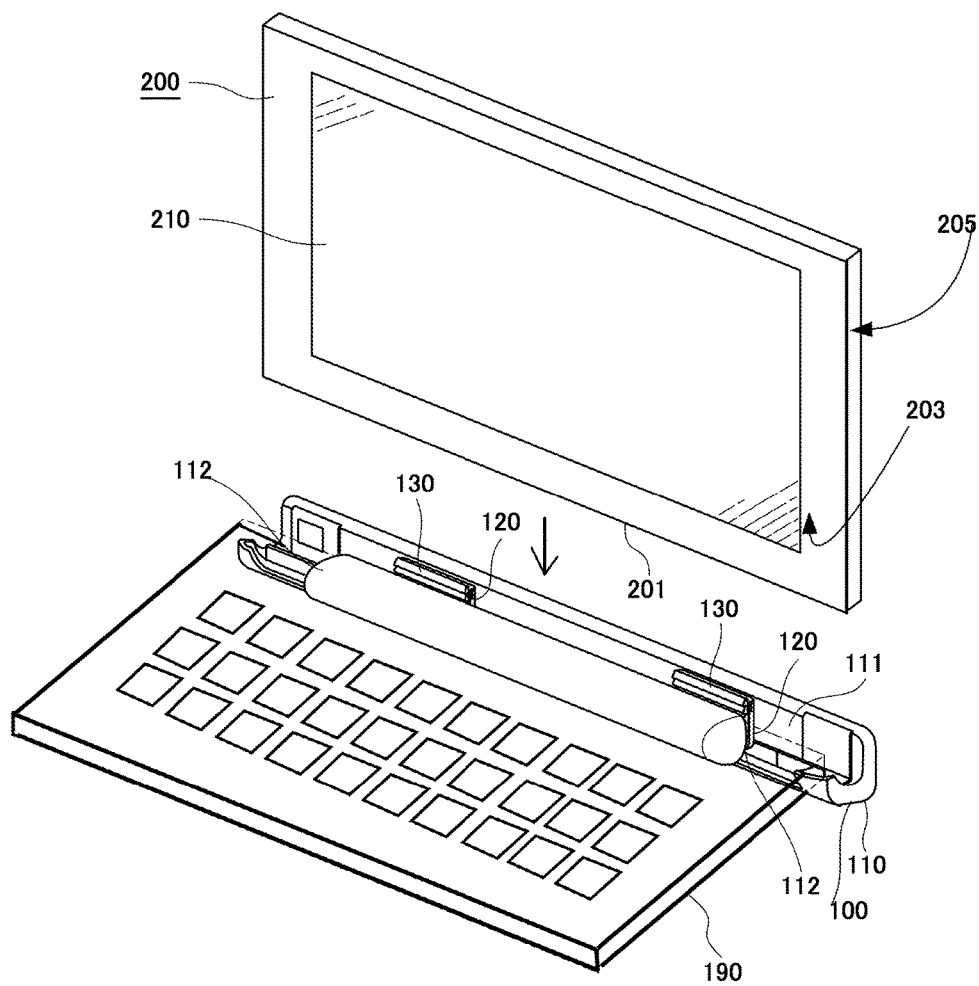
FIG. 2 is an isometric view of the keyboard, a portion of which is shown in FIG. 1 along with a tablet which is engageable with the keyboard according to an embodiment.

FIG. 1 is a partially cutaway view of a tablet receiving portion 110 of an external keyboard 100 for a tablet 200 (FIG. 2). The tablet receiving portion 110 includes a recess 111 for receiving a bottom edge 201 (FIG. 2) of the tablet 200. A first U-shaped channel member 120A and a second U-shaped channel member 120B are located spaced from each other in the recess 111. Each of the U-shaped channel members 120A, 120B includes a base portion 129 which is connected to a first upright extending portion 125 and a second upright extending portion 126. The base portion 129, the first upright extending portion 125 and the second upright extending portion 126 form the U-shape. The first upright extending portions 125 are in the foreground of FIG. 1 and the second upright extending portions 126 are in the background of FIG. 1. A first serrated rubber (or other elastomer) pad 140 is affixed to each U-shaped channel member 120A, 120B on the first upright extending portion 125 and a second serrated rubber (or other elastomer) pad 130 is affixed to each U-shaped channel member 120A, 120B on the second upright extending portion 126 of each of the U-shaped channel members 120A, 120B.

Figure 3:
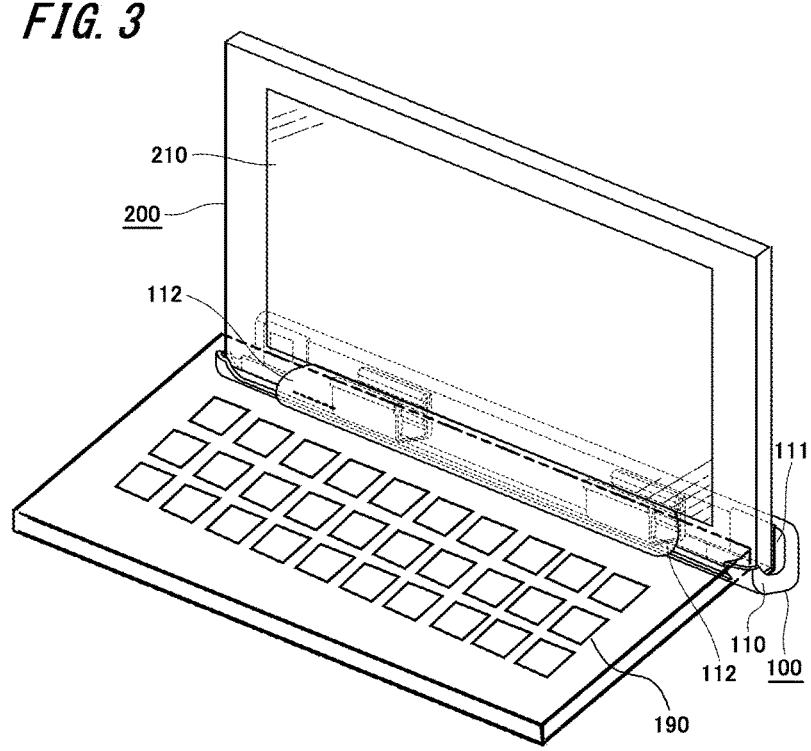
FIG. 3 is an isometric view of the keyboard shown in FIGS. 1-2 engaged with the tablet shown in FIG. 2 according to an embodiment.

FIG. 2 is an isometric view of the keyboard 100, a portion of which is shown in FIG. 1, along with a tablet 200 which is engageable with the keyboard 100 and FIG. 3 is an isometric view of the keyboard 100 engaged with the tablet 200. The keyboard 100 includes the tablet receiving portion 110 and a keypad portion 190. The keypad portion 190 is rotatably connected to the tablet receiving portion 110 by a connection mechanism 112. The connection mechanism 112 can, for example, include a hinge. The connection mechanism 112 is integrated with the tablet receiving portion 110.

The tablet 200 includes a front surface 203 and a rear surface 205. The front surface 203 includes a touch screen display 210. When the bottom edge 201 of the tablet 200 is inserted into the tablet receiving portion 110 the first serrated rubber pads 140 on the first upright extending portions 125 of the U-shaped channels 120A, 120B engage the front surface 203 of the tablet 200 proximate the bottom edge 201 and the second serrated rubber pads 130 on the second upright extending portions 126 of the U-shaped channels 120A 120B engage the rear surface 205 of the tablet 200 proximate the bottom edge 201. The serrated rubber pads 130, 140 sandwich (abut opposite sides) the tablet 200 and help to hold the tablet 200 in the tablet receiving portion 110. As an alternative to having two U-shaped channel members 120A, 120B it is possible to have only one or more than two U-shaped channel members. In the case that only one U-shaped channel member is used it can be centered longitudinally in the tablet receiving portion 110.

Figure 4:
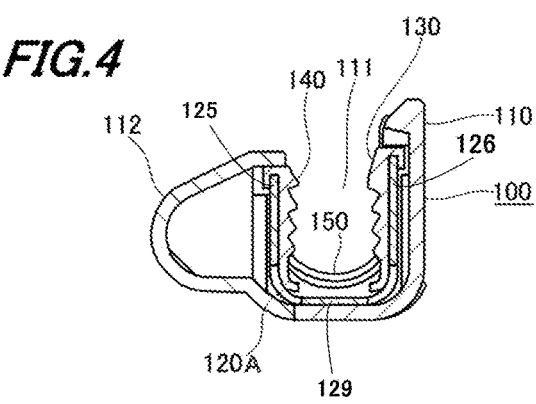
FIG. 4 is a cross-sectional view of the tablet receiving portion of the external keyboard shown in FIGS. 1-3 according to an embodiment.

FIG. 4 is a cross-sectional view of the tablet receiving portion 110 of the keyboard 100 shown in FIGS. 1-3 according to an embodiment. In addition to the elements described hereinabove, FIG. 4 shows a resin sheet 150 that is located in a bottom half of the first U-shaped member 120A and is curved with a concave side facing upward. The resin sheet 150 serves to prevent damage to the bottom edge 201 of the tablet 200 when the tablet 200 is inserted into the tablet receiving portion 110 of the keyboard 100. The resin sheet 150 can also be included in the second U-shaped member 120B. The resin sheet 150 could include a single layer or multiple sheets to support the keyboard 100, and may be formed of a material other than resin to achieve the same effect.

Figure 5:
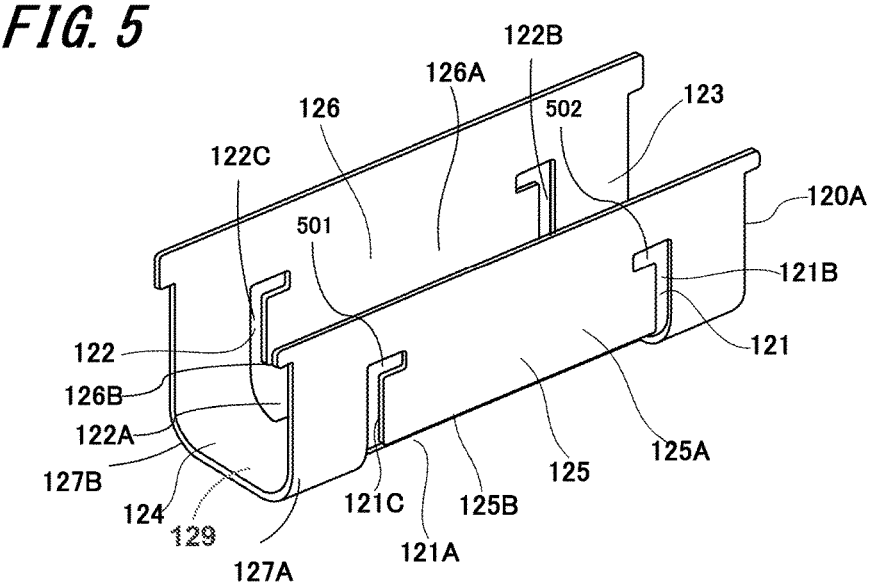
FIG. 5 is an isometric view of one of two U-shaped channel members used in the tablet receiving portion shown in FIGS. 1-4 according to an embodiment.
Figure 6:
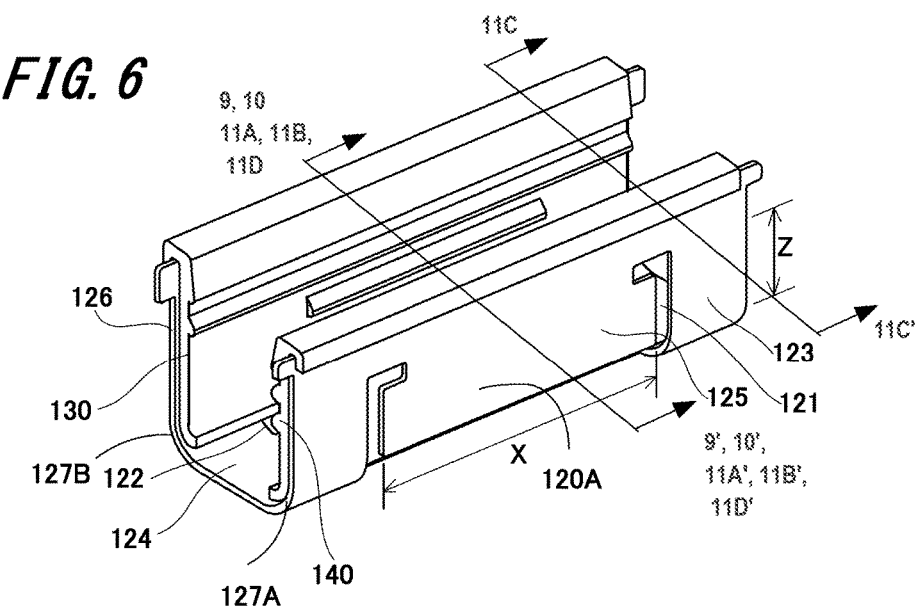
FIG. 6 is an isometric view of one of the U-shaped channel members used in the tablet receiving portion shown in FIGS. 1-4 fitted with serrated rubber pads according to an embodiment.

FIG. 5 is an isometric view of the first U-shaped channel member 120A that used in the tablet receiving portion 110 shown in FIGS. 1-4 according to an embodiment. The second U-shaped channel member 120B can have the same design. The first U-shaped channel member 120A can be formed from a metal sheet, for example using a progressive stamping tool and die set or can be molded from plastic. A first U-shaped slot 121 is formed in the first upright extending portion 125 and partially in a first radiused bend portion 127A that connects the first upright extending portion 125 and the base portion 129. The first U-shaped slot 121 includes a long horizontal part 121A located in the first radiused bend portion 127A (alternatively located at the bottom of the upright extending portion 125), and also includes, extending upward onto the first upright extending portion 125, from opposite ends of the horizontal part 121A: a first upright slot part 121B and a second upright slot part 121C and further includes short horizontal segments 501, 502 extending inward from tops of the upright slot parts 121B, 121C. Similarly a second U-shaped slot 122 is formed in the second upright extending portion 126 and a second radiused bend portion 127B that connects the second upright extending portion 126 and the base portion 129. The first U-shaped slot 121 defines a first resilient tongue shaped portion 125A of the first upright extending portion 125. The resilient tongue shaped portion 125A includes a lower free end 125B located proximate the horizontal part 121A of the first U-shaped slot 121. Similarly, the second U-shaped slot 122 defines a second resilient tongue shaped portion 126A of the second upright extending portion 126 and the second resilient tongue shaped portion 126A includes a lower free end 126B located proximate the horizontal part 122A of the first U-shaped slot 122. The resilient tongue shaped portions 125A, 126A are resilient by virtue of the U-shaped channel member 120A having been formed from, by way of non-limiting examples, resilient plastic or resilient metal. The resilient tongue shaped portions 125A, 126A increases the compliance of the U-shaped channel member 120A and allows the tablet receiving portion 110 to engage tablets having a wider range of thickness with less variation in holding force. The resilient tongue shaped portions 125A, 126A in combination with the serrated rubber pads 140, 130 provide a holding force for holding the tablet 200 when the bottom edge 201 of the tablet 200 is inserted into the tablet receiving portion 110 of the keyboard 100. The U-shaped channel member 120A includes a right end 123 and a left end 124 which are indicated in FIGS. 5, 6. Note that the first upright extending portion 125 is shorter than the second upright extending portion 126.

FIG. 6 is an isometric view of the first U-shaped channel members used in the tablet receiving portion 110 shown in FIGS. 1-4 fitted with the first serrated rubber pad 140 and the second serrated rubber pad 130. The serrated rubber pads 140, 130 cover the upright parts 121B, 121C, 122B, 122C of the slots 121, 122 formed in the first U-shaped channel member 120.

Figure 7A:
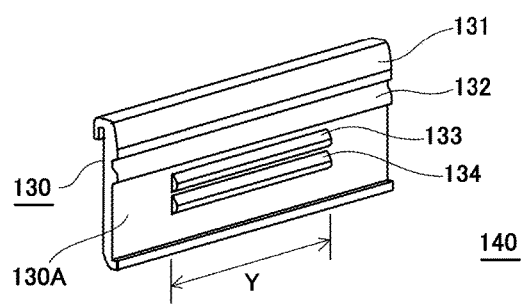
FIG. 7A is a front side perspective view of a second serrated rubber pad shown in FIGS. 1, 2, 4 and 6 and used in the tablet receiving portion according to an embodiment.

FIG. 7A is a front side perspective view of the second serrated rubber pad 130 shown in FIGS. 1, 2, 4 and 6 and used in the tablet receiving portion 110 according to an embodiment. A first protruding line (ridge), 131 a second protruding line 132, a third protruding line 133 and a fourth protruding line 134 which extend horizontally and are parallel to each other are formed in an outward facing tablet engaging surface 130A of the second serrated rubber pad 130. The protruding lines 131, 132, 133, 134 form a serrated profile when viewed endwise. The first protruding line 131 and the second protruding line 132 are located above the third protruding line 133 and the fourth protruding line and extend an entire width of the outward facing surface 130A. The third protruding line 133 and the fourth protruding line 134 are located approximately at a vertical center of the surface 130A and have a length marked with dimension Y which is less than the full width of the surface 130A.

Figure 7B:
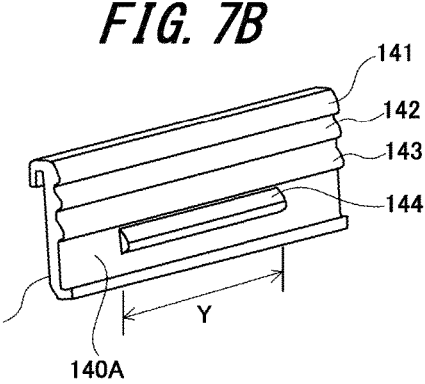
FIG. 7B is a front side perspective view of a first serrated rubber pad shown in FIGS. 1, 2, and 6 and used in the tablet receiving portion according to an embodiment.

FIG. 7B is a front side perspective view of the first serrated rubber pad 140 shown in FIGS. 1, 2, and 6 and used in the tablet receiving portion 110 according to an embodiment. Starting from the top, the first serrated rubber pad 140 includes a first protruding line 141, a second protruding line 142, a third protruding line 143 and a fourth protruding line 144 formed on an outward facing tablet engaging surface 140A of the first serrated pad 140. The protruding lines 141-144 of the first serrated rubber pad 140 extend horizontally parallel to each other across the tablet engaging surface 140A. The top three protruding lines 141, 142, 143 extend a full width of the tablet engaging surface 140A, while the bottom protruding line 144 has a shorter width that is about equal to a width of the first resilient tongue 125A which the bottom protruding line 144 will overlie when the first serrated rubber pad 140 is mounted on the U-shaped channel member 120A or 120B.

Note that the first protruding line 131, the second protruding line 132, the third protruding line 133 and the fourth protruding line 134 of the second serrated rubber pad 130 are positioned across (at the same vertical height) from, respectively, the first protruding line 141, the second protruding line 142, the third protruding line 143 and the fourth protruding line 144 of the first serrated rubber pad 140. Alternatively the vertical heights are offset from each other.

Figure 8A:
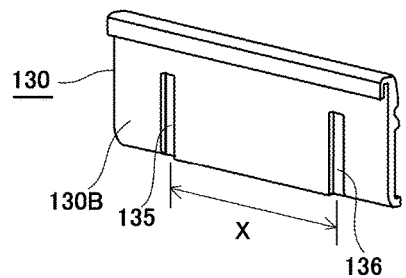
FIG. 8A is a back side perspective view of a second serrated rubber pad shown in FIGS. 1, 2, 4 and 6 and used in the tablet receiving portion shown in FIG. 1 according to an embodiment.

FIG. 8A is a perspective view of a backside 130B of the second serrated rubber pad 130 shown in FIGS. 1, 2, 4 and 6 according to an embodiment. Two thin (relative to surrounding portions), elongated, vertically extending portions 135, 136 of the second serrated rubber pad 130 are shown in FIG. 8A. According to certain embodiments the third protruding line 133 and the fourth protruding line 134 have lengths restricted the regions between two thin elongated vertically extending portions 135, 136. According to certain embodiments the third protruding line 133 and the fourth protruding line 134 have lengths restricted such that the third protruding line 133 and the fourth protruding line 134 are restricted longitudinally to a region between the upright portions 122B, 122Ɵ of the second U-shaped slot 122.

Figure 8B:
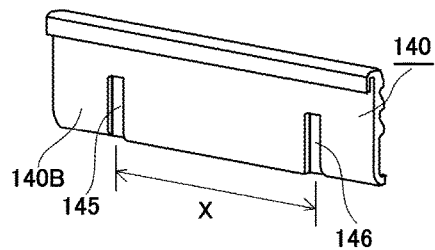
FIG. 8B is a back side perspective view of a first serrated rubber pad shown in FIGS. 1, 2, and 6 and used in the tablet receiving portion shown in FIG. 1 according to an embodiment.

FIG. 8B is a perspective view of a back side 140B of the first serrated rubber pad 140 shown in FIGS. 1, 2, and 6 according to an embodiment. Two thin (relative to surrounding portions), elongated, vertically extending portions 145, 146 of the second serrated rubber pad 130 are shown in FIG. 8A.

The spacing (dimensioned X in FIGS. 6, 8) of the thinned elongated portions 135, 136 matches the spacing X between the first and second upright slot parts 121B, 121C and the thinned elongated portions 135, 136, overlie the upright slot parts 121B, 122C when the serrated rubber pad, 130 is mounted on the U-shaped channel members 120A, 120B. The spacing of thinned elongated portions 145, 146 also matches the spacing of upright slot parts 121B, 121C. The height of the thinned elongated portions 135, 136, 145, 146 also matches the height of the first and second upright slot parts 121B, 122C (and corresponding parts of slot 122). The thinned elongated portions 135, 136, 145, 146 increase the flexibility of the serrated rubber pads 130, 140 fostering maintenance of contact between the serrated rubber pads and an inserted tablet across the length of the protruding lines, particularly the lower protruding lines 133, 134, 143, 144.

Figure 9:
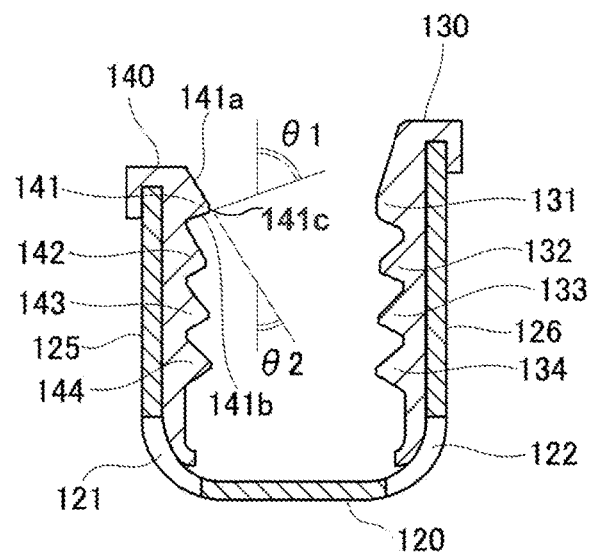
FIG. 9 is a first cross-sectional view through the U-shaped channel member and serrated rubber pads shown in FIGS. 1, 6.

FIG. 9 is a first cross-sectional view through the U-shaped channel member and serrated rubber pads shown in FIGS. 1, 6. As shown in FIG. 9 each protruding line has a cross-sectional shape of a truncated asymmetric triangle including an upper angled surface 141a, and a lower angled surface 141b joined to a top flat surface 141c. Adopting the nomenclature used to describe tooth profiles in mechanical engineering the top flat surface 141c can be termed a "land". Alternatively in lieu of a land 141c the two angle surfaces 141a, 141b can be joined by an intermediate surface having another shape such as a curved surface. As shown in FIG. 9, an angle of the bottom angled surface 141b is indicated as θ1 and an angle of the top angled surface 141a is indicated as θ2. The angles θ1 and θ2 are measured with respect to vertical which corresponds to an insertion direction of the tablet 200. For at least certain protruding lines 141, 142, 143, 131, 132, 133 Θ2 is greater than θ1. Note that the protruding lines 131-134, 141, 144 extend perpendicularly to the insertion direction. The insertion direction is parallel to a vertical axis (indicated in FIG. 9 as the line from which θ1, θ2 are measured). For at least certain protruding lines 141, 142, 143, 131 Θ2 is greater than 45° and θ1 is less than 45°. The angles of θ1 and θ2 provide for easier insertion of the tablet 200 and greater holding force on the tablet 200 once the tablet has been inserted.

Figure 10:
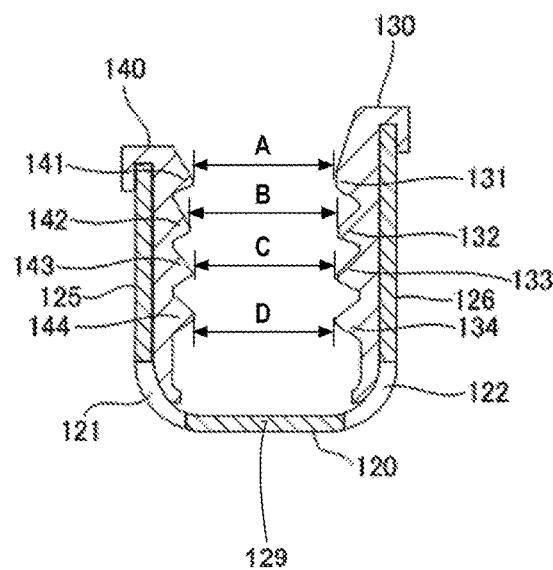
FIG. 10 is a second cross-section view through the U-shaped channel member and serrated rubber pads shown in FIGS. 1, 6.

FIG. 10 is a second cross-section view through the U-shaped channel member and serrated rubber pads shown in FIGS. 1, 6. FIG. 10 shows distances between protruding lines of the first serrated rubber pad 140 and the second serrated rubber pad 130 that are located opposite each other, as shown. According to certain embodiment, when each U-shaped channel member 120A, 120B is in an unflexed state when no tablet 200 is inserted into the tablet receiving portion, the distances between opposed protruding lines is less for protruding lines that are lower down on the serrated rubber pads 130, 140. However, flexing of the resilient tongues 125A, 126 facilitates displacement of the protruding lines located near the bottom of the serrated rubber pads 130, 140 in response to insertion of the tablet 120. Moreover, the provision of the resilient tongues 125A, 126A in combination with the increase height of the protruding lines towards the bottom of the serrated rubber pads 140, 130 fosters uniformity in the contact pressure between the protruding lines and the inserted tablet, leading to improved tablet holding performance.

FIGS. 11A-11D show four cross-section views through the U-shaped channel member 120A and serrated rubber pads 130, 140 with the tablet 200 partially inserted to varying degrees. FIGS. 11A, 11B, 11D correspond to a first section plane (in common with FIG. 9) indicated in FIG. 6 near a longitudinal center of the U-shaped channel member 120A and FIG. 11C corresponds to a second section plane indicated in FIG. 6 closer to the right end 123 of the U-shaped channel member 120A. When the tablet 200 is pushed into the recess 111, the U-shaped channel member 120A including the resilient tongue portions 125A, 126A will flex and protruding lines 131-134, 141-144 of the serrated rubber pads 140, 130 will deform allowing entry of the tablet 200 and simultaneously exerting a gripping force on the tablet. FIGS. 11C and 11D show a state in which the tablet is fully inserted into the U-shaped channel member 120A. In FIG. 11B arrows P1, P2, P3, P4 represent forces exerted by the tablet 200 on the U-shaped channel member 120A. In FIG. 11C arrows P5, P6 represent forces exerted by the tablet 200 on the upper parts of the upright extending portions 125, 126. In FIG. 11D arrows P7, P8 represent forces exerted by the tablet 200 on the lower part (including the lower free end of resilient tongues 125A, 126A) of the upright extending portions 125, 126. The forces represented by arrows P7, P8 are increased relative to what they would otherwise be by reducing the spacing "C" and "D" (FIG. 10) between lower protruding lines 133 and 143; and 134 and 144 respectively, thereby increasing a gripping force on the tablet. Note that for each force represented by one of the arrows P1, P2, P3, P4, P5, P6, P7, P8 there is a reaction force from one of the serrated rubber pads 130, 140 against the inserted tablet 200. The reaction force causes a frictional force parallel to the plane of the tablet between the serrated rubber pads 130, 140 and the tablet 200, which serves to retain the tablet 200 in the recess 111 of the tablet receiving portion 110. As discussed above, due to the asymmetric shape of the protruding lines 131-134, 141-144 the force retaining the tablet 200 is greater than the force resisting insertion of the tablet 200.

Figure 12A:
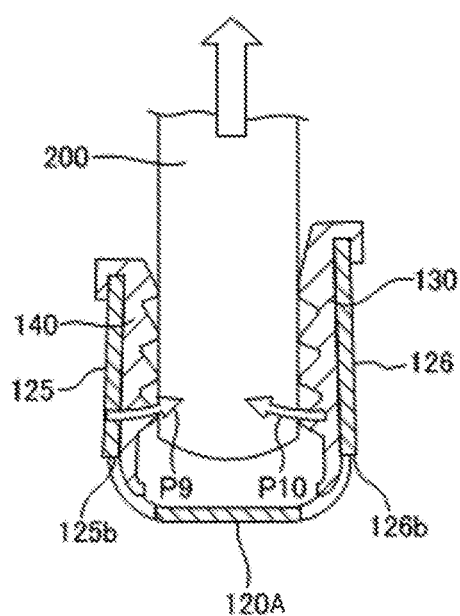
FIG. 12A is a seventh cross-section view through the U-shaped channel member and serrated rubber pads shown in FIGS. 1, 6 with the tablet shown in FIGS. 2-3 partially inserted.

FIG. 12A is a seventh cross-section view through the U-shaped channel member and serrated rubber pads shown in FIGS. 1, 6 with the tablet shown in FIGS. 2-3 partially inserted. The provision of: the U-shaped slots 121, 122 defining the resilient tongues 125A, 126A; along with the reduction in the distance between opposed protruding lines 142, 143, 144, 132, 133, 134 lower down along the serrated rubber pads 140, 130; thinned elongated portions 135, 136, 145, 146; and the differing lengths of the protruding lines serve to increase the abutting force between the serrated rubber pads 140, 130 and the tablet 200 which are represented by arrows P9, P10.

Figure 12B:
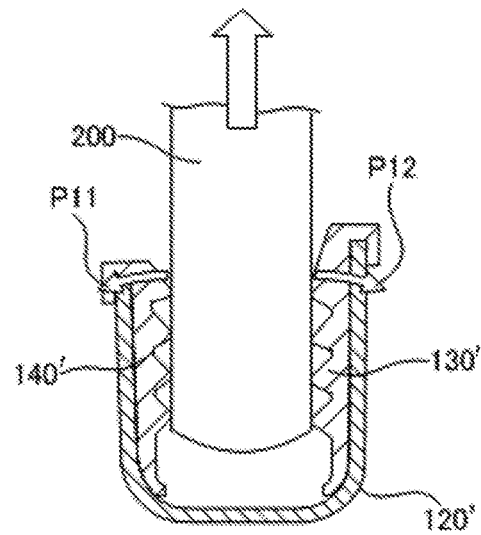
FIG. 12B is a cross-section view through a related art U-shaped channel member and serrated rubber pads with the tablet shown in FIGS. 2-3 partially inserted.

FIG. 12B is a cross-section view through a related art U-shaped channel member 120' and serrated rubber pads 130', 140' with the tablet 200 shown in FIGS. 2-3 partially inserted. It is useful to consider in the case of the related art U-shaped channel member 120', if per chance a user is holding the assembled keyboard 100 and tablet 200 at an angle such that gravity exerts a force tending to pull the tablet 200 out of the tablet receiving portion 110. Due to the shape of the protruding lines 131-134, 141, 144 the force tending to pull the tablet 200 out of the keyboard will create forces denoted by arrows labeled P11, P12 tending to bend open the U-shaped member 120 and release the tablet. On the other hand in the case of the U-shaped channel members 120A, 120B the holding force on the tablet 200 is increased due to the above mentioned features.

Although the tablet receiving portion 110 is discussed above as part of the keyboard 100, alternatively the tablet receiving portion can be used for another purpose such as a charging stand. Additionally the tablet receiving portion 110 can be adapted by appropriate scaling as a smartphone holding device. Both tablets and smartphones are flat touch screen devices. The serrated rubber pad can alternatively be made from a material other than rubber. Although the serrated rubber pads 130, 140 described herein include four protruding lines 131-134, 141-144, alternatively the serrated rubber pads 130, 140 can include a different number of protruding lines. The shape of protruding lines 131-134, 141-144 may also differ from what is shown in the figures and described above. Alternative shapes for the protruding lines 131-134, 141-144 include semielliptical and semicircular which is a special case of semielliptical. Additionally rather than using protruding lines a pattern of protruding bumps, e.g., truncated pyramid or truncated cone shapes can be provided on the tablet engaging surfaces 130a, 140a. Rather than being defined by U-shaped slots 121, 122, alternative resilient tongues 125A, 126A can be defined by V-shaped slots. Additionally in an unstressed state the resilient tongues 125A, 126A can be angled out of the planes of the upright extending portions 125, 126. Additionally in an unstressed state, the resilient tongues 125A, 126A can be flat or curved. Additionally rather than having a flat base portion 129 of the U-shaped channel members 120A 120B, a curved, e.g., semielliptical base portion can be used. As described above and shown in the figures the second upright extending portion 126 is taller than the first upright extending portion 125 and the height of second serrated rubber pad 130 is greater than the height of the first serrated rubber pad 140. Alternatively the heights of the serrated rubber pads 130, 140 are equal and the heights of the upright extending portions 125, 126 are equal.

Regarding the dimensions, A B, C, D (FIG. 10) between opposite protruding lines 131-134, 141-144, one possible relationship is A, B>C>D. More specifically the relation between dimension A, B, C, D can be A=B>C>D or alternatively A>B>C>D. Another possibility is to have A=B=C=D. In mathematical terms a local minimum distance between the first elastomer pad and the second elastomer pad is a monotonic increasing function of distance from the base portion 129. In the case that the lands 141c of the protruding lines 131-134, 141-144 on the opposing serrated rubber pads 130, 140 are vertically aligned the local minimum distance is occur at positions corresponding to the lands 141c. In the case that the lands 141c of the protruding lines 131-134, 141-144 on the opposing serrated rubber pads 130, 140 are not vertically aligned the local minimum distance do not necessarily occur at positions aligned with the lands 141c.

Numerous further modifications and variations of the present invention are possible in light of the above teachings. It is therefore to be understood that within the scope of the appended claims, the invention may be practiced otherwise than as specifically described herein.

The invention claimed is:

1. An apparatus for holding a screen device, the apparatus comprising:
    an elongated recess sized to receive a side edge of the screen device;
    at least one U-shaped resilient member disposed in the elongated recess; and
    first and second elastomer pads positioned on first and second upright portions of the at least one U-shaped resilient member respectively, each of the elastomer pads including a first screen device engaging surface, wherein
    each upright portion comprises at least one U-shaped slot defining a resilient portion that abuts the corresponding elastomer pad,
    each of the resilient portions include a free end extended toward a bottom of the at least one U-shaped resilient member and an opposite end connected to a top of the at least one U-shaped resilient member, and
    when the screen device is inserted into the recess, pressured is exerted on the resilient portions by the elastomer pads so as to hold the screen device.

2. The apparatus of claim 1, wherein
    the first screen device engaging surface comprises at least one protruding line.

3. The apparatus of claim 2, wherein
    the at least one protruding line has a cross-sectional shape that includes a lower angled surface, an upper angled surface and an intermediate surface joining the lower angled surface and the upper angled surface.

4. The apparatus of claim 3, wherein
    the lower angled surface is angled at more than 45 degrees with respect to an insertion direction which is parallel to a vertical axis of the U-shaped resilient member, and wherein the upper angled surface is angled less than 45 degrees with respect to the insertion direction.

5. The apparatus of claim 2, wherein
    the at least one protruding line comprises a plurality of protruding lines.

6. The apparatus of claim 2, wherein
    the at least one protruding line at least partially overlies the resilient portion.

7. The apparatus of claim 6, wherein
    the at least one protruding line fully overlies the resilient portion.

8. The apparatus of claim 7, wherein
    the at least one protruding line has a cross-sectional shape that includes a lower angled surface, an upper angled surface and an intermediate surface joining the lower angled surface and the upper angled surface.

9. The apparatus of claim 8, wherein
    the lower angled surface is angled more than 45 degrees with respect to an insertion direction which is parallel to a vertical axis of the U-shaped resilient member, and the upper angled surface is angled less than 45 degrees with respect to the insertion direction.

10. The apparatus of claim 7, wherein
    the first protruding line is vertically aligned with the second protruding line.

11. The apparatus of claim 7, wherein
    the first touch screen device engaging surface comprises a first plurality of protruding lines including the first protruding line.

12. The apparatus of claim 11, wherein
    the second touch screen device engaging surface comprises a second plurality of protruding lines including the second protruding line.

* * * * *